United States Patent
Gardner et al.

(10) Patent No.: US 8,501,345 B2
(45) Date of Patent: Aug. 6, 2013

(54) BATTERY CELL DESIGN WITH ASYMMETRICAL TERMINALS

(75) Inventors: William H. Gardner, East Freetown, MA (US); Stefan Tillmann, Berlin (DE)

(73) Assignee: A123 Systems LLC, Waltham, MA (US)

( * ) Notice: Subject to any disclaimer, the term of this patent is extended or adjusted under 35 U.S.C. 154(b) by 1017 days.

(21) Appl. No.: 12/323,197

(22) Filed: Nov. 25, 2008

(65) Prior Publication Data
US 2009/0169990 A1    Jul. 2, 2009

Related U.S. Application Data

(60) Provisional application No. 60/991,602, filed on Nov. 30, 2007.

(51) Int. Cl.
H01M 2/02 (2006.01)
H01M 4/02 (2006.01)
H01M 4/04 (2006.01)

(52) U.S. Cl.
USPC ......... 429/179; 429/211; 29/623.1; 29/623.2; 29/623.5

(58) Field of Classification Search
USPC ............ 429/179, 211; 29/623.1, 623.2, 623.5
See application file for complete search history.

(56) References Cited

U.S. PATENT DOCUMENTS

| | | | |
|---|---|---|---|
| 4,332,867 A | 6/1982 | Tsuda et al. | |
| 4,966,822 A | 10/1990 | Johnston | |
| 5,464,705 A | 11/1995 | Wainwright | |
| 5,554,459 A | 9/1996 | Gozdz et al. | |
| 5,834,133 A | 11/1998 | Narukawa et al. | |
| 6,080,506 A | 6/2000 | Davis et al. | |
| 6,159,253 A | 12/2000 | Lund | |
| 6,284,412 B1 | 9/2001 | Minakata et al. | |
| 6,298,530 B1 | 10/2001 | Barber et al. | |
| 6,344,292 B1 | 2/2002 | Nemoto et al. | |
| 6,432,574 B1 | 8/2002 | Suzuki et al. | |
| 6,673,128 B2 | 1/2004 | Payne et al. | |
| 6,692,866 B2 * | 2/2004 | Watanabe et al. | ............. 429/129 |
| RE38,518 E | 5/2004 | Tucholski | |

(Continued)

FOREIGN PATENT DOCUMENTS

| | | |
|---|---|---|
| EP | 0771040 A2 | 5/1997 |
| EP | 0969538 | 1/2000 |

(Continued)

OTHER PUBLICATIONS

International Search Report, International Application No. PCT/US2006/34478, mailed Aug. 13, 2007, 1 page.

(Continued)

*Primary Examiner* — Joseph Kosack

(74) *Attorney, Agent, or Firm* — Wilmer Cutler Pickering Hale and Dorr LLP

(57) ABSTRACT

An electrochemical cell is provided. The cell includes a plurality of electrode sheets separated by at least one separator sheet. A positive extension tab is attached to a current collecting tabs of positive electrode sheets, and a negative extension tab is attached to current collecting tabs of the negative electrode sheets. The dimensions of the positive extension tab and the negative extension tab are selected such that temperature difference between positive extension tab and the negative extension tab are minimized when the electrochemical cell is in use.

43 Claims, 19 Drawing Sheets

U.S. PATENT DOCUMENTS

| | | |
|---|---|---|
| 6,780,303 B2 | 8/2004 | Colombier |
| 6,875,540 B2 | 4/2005 | Nemoto et al. |
| 6,884,541 B2 | 4/2005 | Enomoto et al. |
| 2003/0091893 A1 | 5/2003 | Kishiyama et al. |
| 2003/0099880 A1* | 5/2003 | Park et al. .................... 429/211 |
| 2003/0175587 A1 | 9/2003 | Okutani et al. |
| 2003/0194601 A1 | 10/2003 | Lei |
| 2003/0211388 A1 | 11/2003 | Ruth et al. |
| 2004/0121230 A1 | 6/2004 | Fong et al. |
| 2004/0157115 A1 | 8/2004 | Bouffard et al. |
| 2004/0157120 A1 | 8/2004 | Wu |
| 2004/0214076 A1 | 10/2004 | Tsukamoto et al. |
| 2004/0237290 A1 | 12/2004 | Ura |
| 2004/0265683 A1 | 12/2004 | Merrill et al. |
| 2006/0046137 A1 | 3/2006 | Kodama |
| 2006/0115729 A1 | 6/2006 | Lee |
| 2007/0134558 A1 | 6/2007 | Fukunaga et al. |
| 2008/0292962 A1 | 11/2008 | Jung |

FOREIGN PATENT DOCUMENTS

| | | |
|---|---|---|
| EP | 1988588 A1 | 11/2008 |
| JP | 09092250 | 4/1997 |
| JP | 2001-35476 * | 2/2001 |
| WO | WO-2005/076936 | 8/2005 |
| WO | WO-2006008812 A1 | 1/2006 |

OTHER PUBLICATIONS

Written Opinion of the International Searching Authority and the International Search Report for PCT/US2008/084759 dated Jul. 20, 2009, 8 pages.

European Search Report for European Patent Application No. 08856364.8 mailed Apr. 4, 2013. 7 pages.

* cited by examiner

Al / Cu tab width = 61 / 39 mm

Temperature vs. time, selected configuration

Tpostab = temperature in center of positive tab at intersection with cell body
Tnegtab = temperature in center of negative tab at intersection with cell body
Tcenter = temperature of center of cell body

BATTERY CELL DESIGN WITH ASYMMETRICAL TERMINALS

This patent application claims priority to U.S. Provisional Patent Application No. 60/991,602 filed Nov. 30, 2007.

BACKGROUND OF THE INVENTION

1. Field of the Invention

The present invention generally relates to an electrochemical battery cell. More particularly, the present invention relates to designs of power terminals of an electrochemical battery cell.

2. Background

An electrochemical battery cell can be, for example, a prismatic cell or a cylindrical cell. A prismatic cell (e.g., a prismatic lithium ion cell) includes cathode and anode sheets or plates that are stacked together; while in a cylindrical cell the electrode sheets are rolled into a cylindrical structure. The electrode sheets are separated by non-conductive layer(s) and sealed hermetically within a cell enclosure. Typically, a conventional prismatic battery cell has two power terminals or extension tabs (a positive terminal and a negative terminal) disposed at one end or two opposite ends of the cell. Extension tabs can extend from current collecting tabs attached to the electrodes. The positive and negative extension tabs are typically made from different materials. For example, the extension tabs are often made of aluminum (positive) and copper (negative) or nickel (negative).

Conventional prismatic cells have extension tabs that are symmetric in size (i.e., the dimensions of the positive and negative extension tabs are identical). FIGS. 1A, 1B, and 1C illustrate prior art prismatic cells 102, 104, and 106, respectively. As shown, the dimensions of the extension tabs (terminals 112a, 112b for cell 102, terminals 114a, 114b for cell 104, and terminals 116a, 116b for cell 106) are roughly identical for each cell.

When electrical currents on the positive extension tab and the negative extension tab of a cell are high enough, joule heating in the two extension tabs becomes significant relative to heat transfer by thermal conduction out of the terminals. Because the two extension tabs are constructed from different materials having different electrical resistivity and thermal conductivity, heat built-up on the two extension tabs caused by the electrical currents is different. Therefore, the temperatures of symmetric extension tabs made from materials with inherently different thermal and electrical properties will not be identical, and one extension tab or terminal will have a higher temperature during the lifetime of the cell. This difference in temperature depends on the actual cycling current and the thermal environment to which the cell is exposed, but can be large and can be a limiting factor in the performance of the cell with respect to cell life and/or behavior. This problem is especially significant when the cell is subjected to abuse conditions such as a low resistance external short circuit. Hence, a cell design that reduces the differences in cell temperatures (and/or the maximum cell temperature) is desirable.

SUMMARY OF THE INVENTION

A battery cell with asymmetric power terminals is provided. In some embodiments, the sizes of the positive terminal and the negative terminal (and the corresponding current collecting tabs) are selected to be proportional to the electrical resistivity and thermal conductivity of their respective materials of construction. This design reduces temperature differences within the electrochemical cell. The maximum temperature within the electrochemical cell (i.e., the temperature of the hottest point in the cell) is also reduced.

In some embodiments, a prismatic cell includes a plurality of positive electrodes and negative electrodes. A power terminal or extension tab attached to the positive electrodes can be made from a first conductive material that is comparable with the electrical and chemical properties of the positive electrode, and a power terminal or extension tab attached to the negative electrodes can be made from a second conductive material that is comparable with the electrical and chemical properties of the negative electrode. In a lithium ion battery, the positive extension tab can be aluminum and the negative extension tab can be nickel or copper. For these extension tab combinations (e.g., Al/Cu or Al/Ni), the cross-sectional area of the negative extension tab can be selected to be about ⅔ of the cross-sectional area of the positive extension tab. In one embodiment, the thickness of the positive and negative extension tabs are identical, while the width of the negative extension tab is selected to be about ⅔ of the width of the positive extension tab. The prismatic cell can be, for example, a lithium ion cell.

According to an exemplary aspect of the invention, an electrochemical cell is provided having a plurality of positive and negative electrode sheets. The electrode sheets each have current collecting tabs. A positive terminal or extension tab extends from the current collecting tabs of the positive electrode sheets, and a negative terminal or extension tab extends from the current collecting tabs of the negative electrode sheets. A cross sectional area of the positive extension tab is different than a cross sectional area of the negative extension tab. The electrode sheets include an active material on the sheets' surfaces, while the portions of the electrode sheets forming the current collecting tabs are not covered by the active material.

According to another exemplary aspect of the present invention, a lithium battery is provided that comprises a plurality of positive electrode sheets having current collecting tabs, and a plurality of negative electrode sheets having current collecting tabs. An electrolyte of the battery is in ionic contact with the positive and negative electrode sheets. A positive terminal or extension tab is extended from the current collecting tabs of the positive electrode sheets, and a negative terminal or extension tab is extended from the current collecting tabs of the negative electrode sheets. A pouch encloses the positive and negative electrode sheets. The pouch is sealed around the positive and negative electrode sheets such that the positive extension tab and the negative extension tab extend from inside to outside of the pouch. A cross sectional area of the positive extension tab is different than a cross sectional area of the negative terminal.

According to a further exemplary aspect of the present invention, a method of making an electrochemical cell is provided. The method comprises providing a plurality of positive electrode sheets with current collecting tabs, and providing a plurality of negative electrode sheets with current collecting tabs. The method further includes extending a positive terminal or extension tab from the current collecting tabs of the positive electrode sheets; and extending a negative terminal or extension tab from the current collecting tabs of the negative electrode sheets. A cross sectional area of the positive extension tab is selected to be different than a cross sectional area of the negative extension tab based on properties of the materials used for the extension tabs, such as electrical resistively and thermal conductivity.

In an embodiment, dimensions of the positive and negative extension tabs comprise a width and thickness. The width of the positive extension tab may be different than the width of the negative extension tab. Likewise, the thickness of the positive extension tab may be different than the thickness of the negative extension tab.

In an embodiment, the current collecting tabs of the positive electrode sheets are welded together to provide a welded portion. The current collecting tabs of the negative electrode sheets are also welded together to provide another welded portion. The positive extension tab is welded at the welded portion of the positive current collecting tabs, and the negative extension tab is welded at the welded portion of the negative current collecting tabs.

In an embodiment, a sealant material can be disposed on the positive extension tab and the negative extension tab to form a seal with the pouch. The pouch material may comprise, for example, laminated layers comprising at least one of polyethylene, nylon, and aluminum foil.

In an embodiment, the positive extension tab is disposed on an outermost one of the current collecting tabs of the positive electrode sheets; and the negative extension tab is disposed on an outermost one of the current collecting tabs of the negative electrode sheets.

In an embodiment, the positive extension tab may comprise aluminum and the negative extension tab copper, such that the positive extension tab is approximately 60 mm thick and the negative extension tab is approximately 40 mm thick.

In an embodiment, a separator sheet is interposed between the positive electrode sheets and the negative electrode sheets. The separator sheet may be a continuous sheet that is folded between the positive electrode sheets and the negative electrode sheets.

In accordance with an aspect of the invention, the positive extension tab has a predetermined cross sectional area, and the negative extension tab has a different cross sectional area, such that during use the positive extension tab has a first temperature and the negative extension tab has a second temperature to form an optimal temperature difference between the positive extension tab temperature and the negative extension tab temperature. The optimal temperature difference will not be decreased any further by changing the ratio of the cross sectional area of the positive extension tab to the cross sectional area of the negative extension tab.

BRIEF DESCRIPTION OF THE DRAWING

The invention is described with reference to the following figures, which are provided for the purpose of illustration only, the full scope of the invention being set forth in the claims that follow.

DETAILED DESCRIPTION

Battery cells with asymmetric power terminals are described. Some embodiments provide cells having terminals or extension tabs that are sized proportional to their respective electrical and thermal properties. This allows the temperature at the hottest point in the cell, as well as temperature gradient of the cell (i.e., difference between the maximum temperature and the minimum temperature in the cell) to be reduced. Because cell performance and safety are generally limited by the temperature of the hottest point in the cell, cells having extension tabs that are sized proportional to their respective electrical and thermal properties allow cycling at increased rates, increased cell lifetime, increased cell safety, and/or some combination of these effects.

Figure 1C:
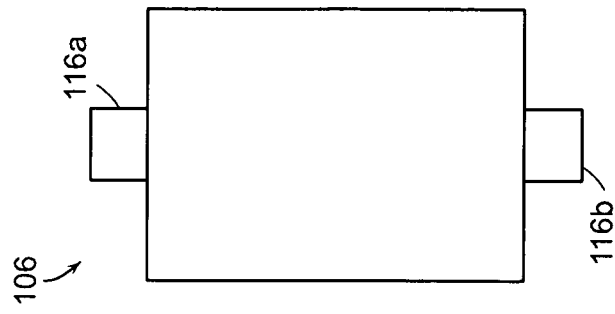
FIG. 1C is a front view of yet another conventional prismatic battery cell.
Figure 1B:
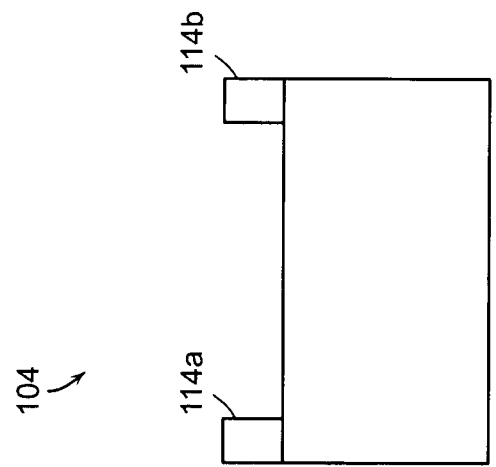
FIG. 1B is a front view of another conventional prismatic battery cell.
Figure 1A:
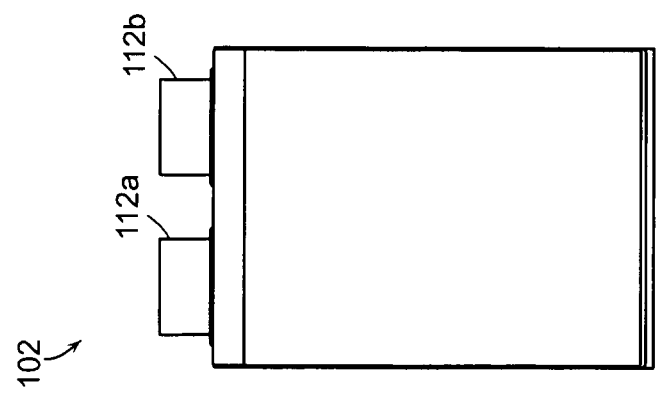
FIG. 1A is a front view of a conventional prismatic battery cell.
Figure 2A:
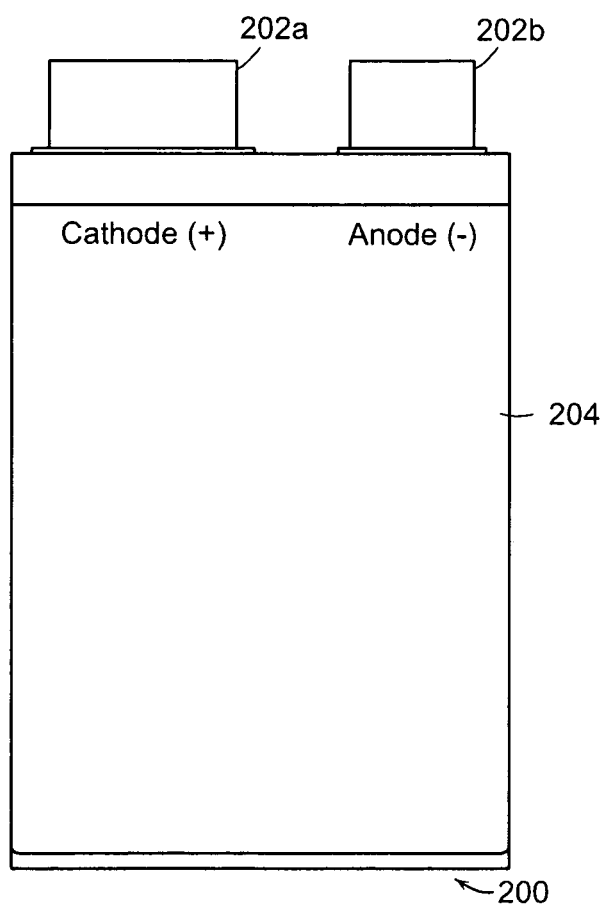
FIG. 2A is a front view of a prismatic battery cell according to various embodiments.
Figure 2B:
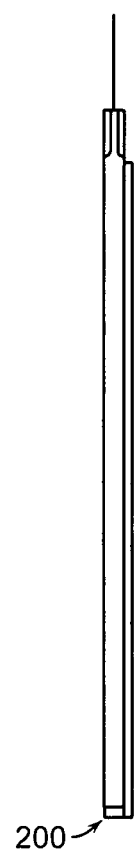
FIG. 2B is a side view of the prismatic battery cell shown in FIG. 2A.

FIG. 2A is a front view of a prismatic battery cell 200 according to various embodiments. FIG. 2B is a side view of the prismatic battery cell shown in FIG. 2A. Cell 200 has a positive power terminal or extension tab 202a and a negative power terminal or extension tab 202b that are asymmetric in size. The asymmetric terminals (which extend from current collecting tabs of the electrode sheets) can be adapted to virtually any cell chemistry that uses relatively thin electrodes. The thermal features of asymmetric extension tabs are useful for cells that are designed to operate at relatively high rates. Typical cell chemistries that run at high rates might be nickel/metal hydride or nickel/cadmium. Cell 200 can be, for example, a lithium ion cell. In some embodiments, extension tab 202a can be attached to current collecting tabs of the positive electrodes, and extension tab 202b can be attached to current collecting tabs of the negative electrodes. Current collecting tabs of the positive electrodes can be made from aluminum, and current collecting tabs of the negative electrodes can be made from copper or nickel.

The materials from which current collectors and extension tabs of electrochemical cells are constructed are generally limited to those which are electrochemically compatible with the electrolyte and voltage of the cell. In the case of a lithium ion cell with an organic solvent based electrolyte operating at 3-5 V open circuit potential, the material of the positive current collectors, positive tabs and any other conductive elements at the positive electrode potential that are wetted with electrolyte should be resistant to electrochemical corrosion at the potential of the positive electrode potential. Materials that tend to be resistant to electrochemical corrosion at the positive electrode potential of a lithium ion cell include aluminum, molybdenum, titanium, and certain stainless steel alloys, for example. Of these materials, aluminum has the highest electrical and thermal conductivity to cost ratios, making it an exemplary material for use at positive electrode potential. In the case of a lithium ion cell with an organic solvent based electrolyte operating at 3-5 V open circuit potential, the material of the negative current collectors, negative tabs and any other conductive elements at the negative electrode potential that are wetted with electrolyte should be resistant to alloying with lithium at the negative electrode potential. Materials that tend to be resistant to alloying with lithium at the negative potential of the lithium ion cell include copper, nickel and iron, for example. Of these materials, copper has the best electrical and thermal conductivities, making it an exemplary material for use at the negative electrode potential in a lithium ion cell.

As shown, extension tabs 202a and 202b are not identical in size. In some embodiments, the width of the negative extension tab 202b can be selected to be approximately ⅔ of the width of the positive extension tab 202a, while the thickness of the extension tabs can be identical. In this case, the cross-sectional area of the negative extension tab 202b is also approximately ⅔ of the cross-sectional area of the positive extension tab 202a. This asymmetric terminal design reduces temperature difference for the two power extension tabs 202a and 202b as well as the thermal gradient when the cell is used, in cases, for example, when that the extension tab 202a is made from aluminum and the extension tab 202b is made from copper or nickel. The maximum temperature of the cell (i.e., the temperature at the hottest point of the cell) at certain points in time is also reduced.

If extension tabs 202a and 202b are made from materials other than aluminum, copper, or nickel, different dimensions for the extension tabs can be selected to reduce maximum temperature and temperature gradient of the cell. The cross-sectional area of the extension tabs is a determining factor for temperatures of the extension tabs, which can affect the maximum temperature and temperature gradient of the cell. If the thicknesses of the two extension tabs are selected to be identical, the width of the extension tabs can be adjusted to achieve an optimal effect. However, the thickness of the two terminals need not be selected to be identical.

Figure 3:
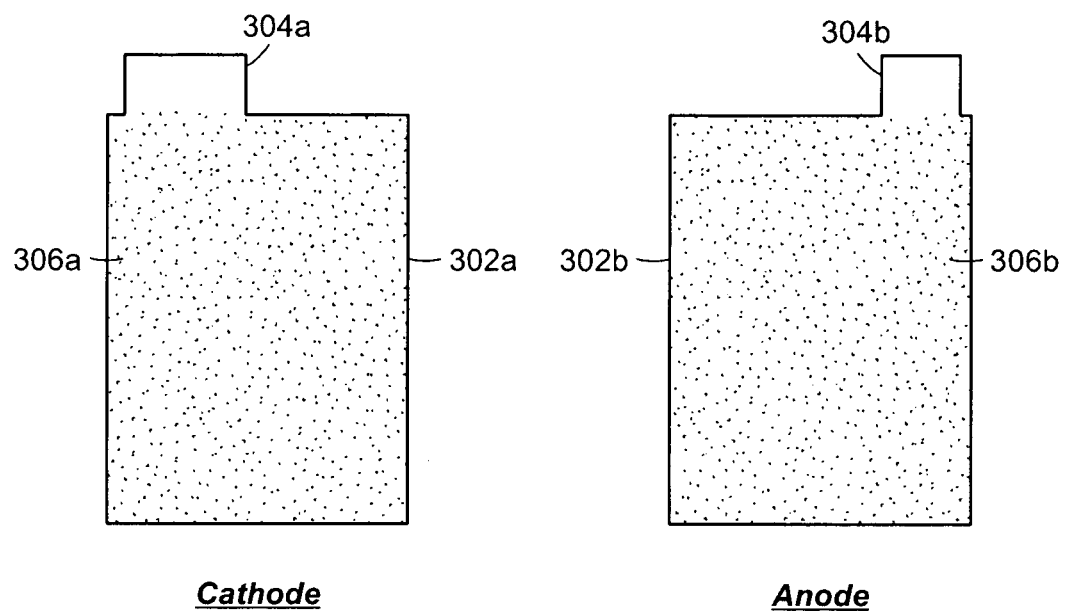
FIG. 3 is a diagram illustrating cathode and anode sheets and attached current collecting tabs of a prismatic battery cell according to various embodiments.

FIG. 3 is a diagram illustrating the cathode and anode sheets 302a, 302b and attached current collecting tabs 304a, 304b of a prismatic battery cell according to some embodiments. The dimensions of the electrode sheets can have any range that will provide the desired thermal and electrical properties, and that will be compatible with the volume requirements (e.g., available space) of the cell. As an example, the cathode sheets can be approximately 143 mm wide and 198 mm long, and the anode sheets can be approximately 145 mm wide and 200 mm long. Current collecting tab 304b as depicted has a width that is approximately ⅔ of the width of current collecting tab 304a. By way of example, the width of current collecting tab 304a can be selected to be approximately 56.5 mm, and the width of current collecting tab 304b can be selected to be approximately 36.0 mm. The current collecting tabs may be cut during the manufacturing process to provide a suitable height.

The electrode sheets 302a comprise a first active material 306a as known in the art. The current collecting tabs 304a of the electrode sheets 302a sheets are extended portions of the electrodes sheets 302a that are not covered by the active material 306a. Likewise, the electrode sheets 302b comprise an active material 306b. The current collecting tabs 304b of the negative electrode sheets 302b are extended portions of the negative electrodes sheets 302b that are not covered by the material 306b.

Figure 4:
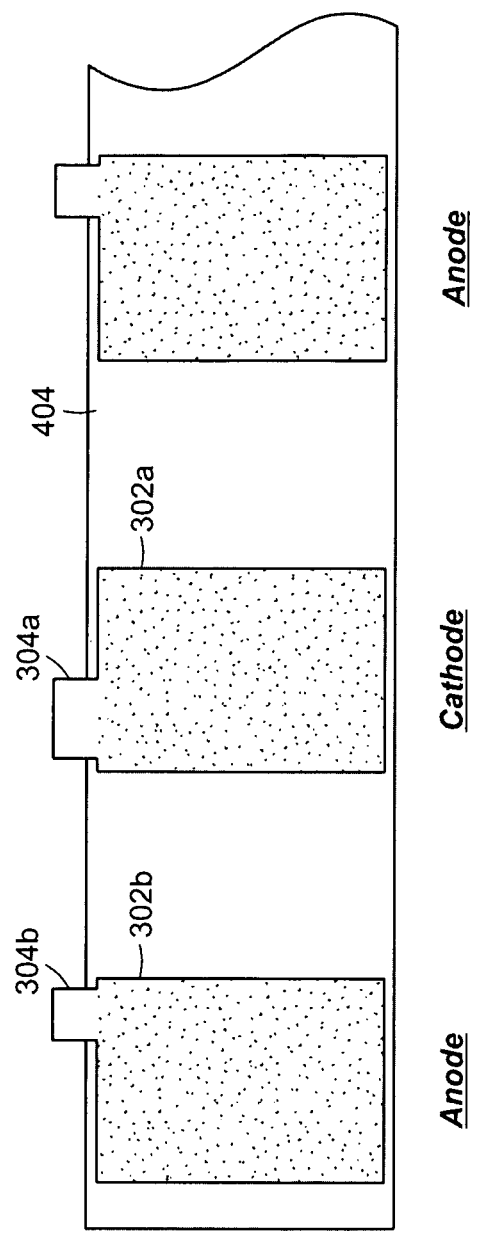
FIG. 4 is a diagram illustrating a series of cathode and anode sheets disposed on a separator sheet before being assembled into a prismatic battery cell.

FIG. 4 is a diagram illustrating a series of cathode and anode sheets (e.g., 302a, 302b) disposed on a portion of a separator sheet 404 before being assembled into a prismatic battery cell. The separator sheet 404 with electrode sheets (e.g., 302a, 302b) can be folded horizontally, e.g., in an accordion pleat, so that the electrode sheets are stacked on top of one another and separated by separator sheet 404. This folding process can be referred to as stack-winding. The relative positions of electrodes 302a, 302b are selected for proper stacking and alignment of the electrodes between separator sheets. The dimensions of the separator sheet can have any range that is necessary to separate the electrodes, and that will be compatible with the volume requirements (e.g., available space) of the cell. For example, assuming that the electrodes are 143-145 mm wide, the separator sheet can be approximately 206 mm wide and 0.025 mm thick, and the distances between the electrodes when placed on the separator sheet can be approximately 145 mm.

The relative positions of current collecting tabs (e.g., tab 304b) on anode sheets (e.g., sheet 302b) are formed so that the tabs will be aligned with one another vertically after stack-winding. Similarly, the positions of current collecting tabs (e.g., tab 304a) on cathode sheets (e.g., sheet 302a) are also selected so that the tabs are aligned vertically after stack-winding. In some embodiments, there can be approximately 20 to 30 anode sheets and 20 to 30 cathode sheets in the prismatic cell. After stack-winding, the inner components of the battery cell (e.g., electrodes and separator sheet) can be hermetically sealed. In one embodiment, the inner components can be sealed within an enclosure made of a pouch material. A typical cell pouch material is comprised of laminated layers of polyethylene, nylon, and aluminum foil. However, any other suitable enclosure can be used to seal the inner components of the cell.

Figure 5:
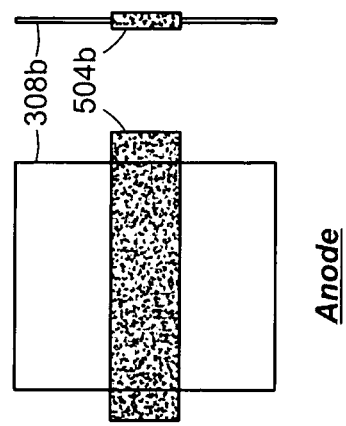
FIG. 5 includes front and side views of extension tabs for cathode and anode sheets of a prismatic battery cell according to various embodiments.
Figure 5:
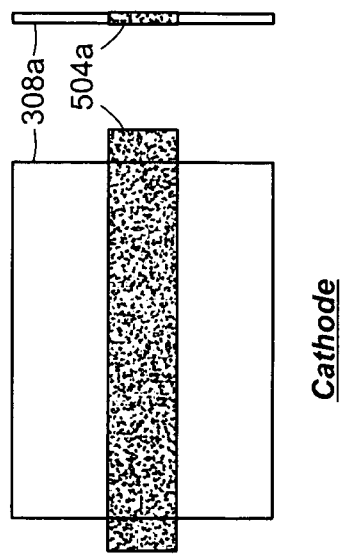

Extension tabs are welded or otherwise affixed to the current collecting tabs. The extension tabs may include a strip of material for sealing purposes as discussed below in more detail. FIG. 5 shows front and side views of extension tabs 308a, 308b attached to current collecting tabs 304a, 304b of the positive and negative electrode sheets 302a, 302b respectively. The dimensions of the extension tabs 308a, 308b can have any range that will provide the desired thermal and electrical properties, and that will be compatible with the volume requirements (e.g., available space) of the cell. By way of example, the thickness of the extension tabs 308a, 308b can be approximately 0.4 mm. Sealing strips 504a, 504b can be disposed across the middle of extension tabs 308a, 308b respectively. The strips 504a, 504b are used for sealing the inner components of the battery cell, as will be explained in connection with FIG. 7.

Figure 6:
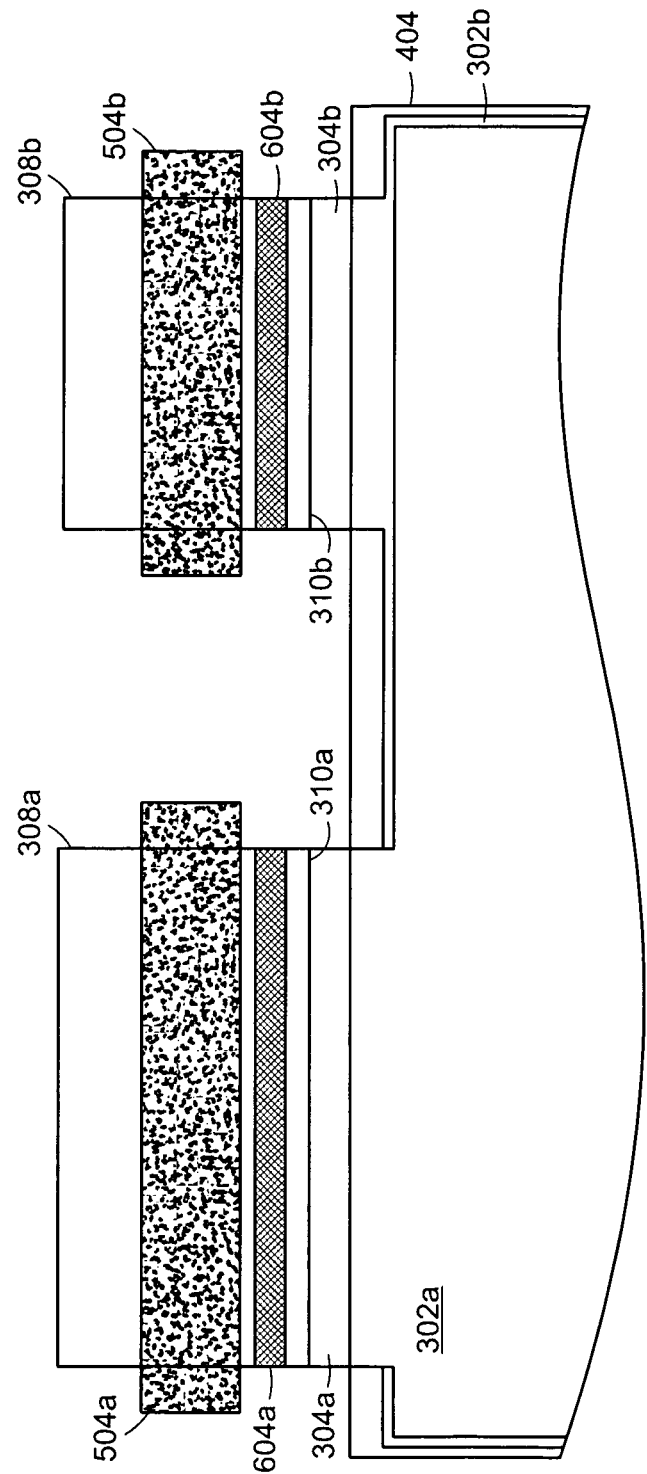
FIG. 6 is a diagram illustrating welding locations of a tab assembly of a prismatic battery cell, according to various embodiments.

Once the current collecting tabs 304a, 304b have been stacked, they are joined together with the extension tabs 308a, 308b, typically by welding through the thickness of the tab assembly. FIG. 6 is a diagram illustrating the dimensions and welding locations of the tab assembly of the prismatic battery cell. FIG. 6 shows positions of the current collecting tabs 304a, 304b and extension tabs 308a, 308b after stack winding. Extension tabs 308a, 308b have strips 504a, 504b attached as previously shown. Current collecting tabs 304a, 304b and extension tabs 308a, 308b respectively have welding sections 604a, 604b below strips 504a, 504b. At the welding sections 604a, 604b, the positive currently collecting tabs (e.g., tabs 304a) and the negative current collecting tabs (e.g., tabs 304b) are welded together, using, for example, ultrasonic welding, resistance welding, laser welding, or any other suitable welding techniques. The extension tabs 308a, 308b are welded to the grouped current collecting tabs 304a, 304b respectively. As shown in FIG. 6, bottoms 310a, 310b of extension tabs 308a, 308b overlap with the grouped current collecting tabs 304a, 304b, such that, for example, a single extension tab 308a extends from the grouped current collecting tabs 304a. Likewise, a single extension tab 308b extends from the grouped current collecting tabs 304b. The cross sectional areas of the grouped current collecting tabs 304a, 304b, may also be different from each other to provide a suitable ratio in accordance with the invention. In an embodiment, the current collecting tabs are welded together at the same time the extension terminals are welded to the current collecting tabs. This may be the case, for example, when ultrasonic welding methods employed as excitation from ultrasonic welding tend to damage other welds in the proximity of the weld being made. In another embodiment, it is not necessary to join the current collecting tabs and extension terminals all together at the same time and they can be attached in separate processes.

Figure 7:
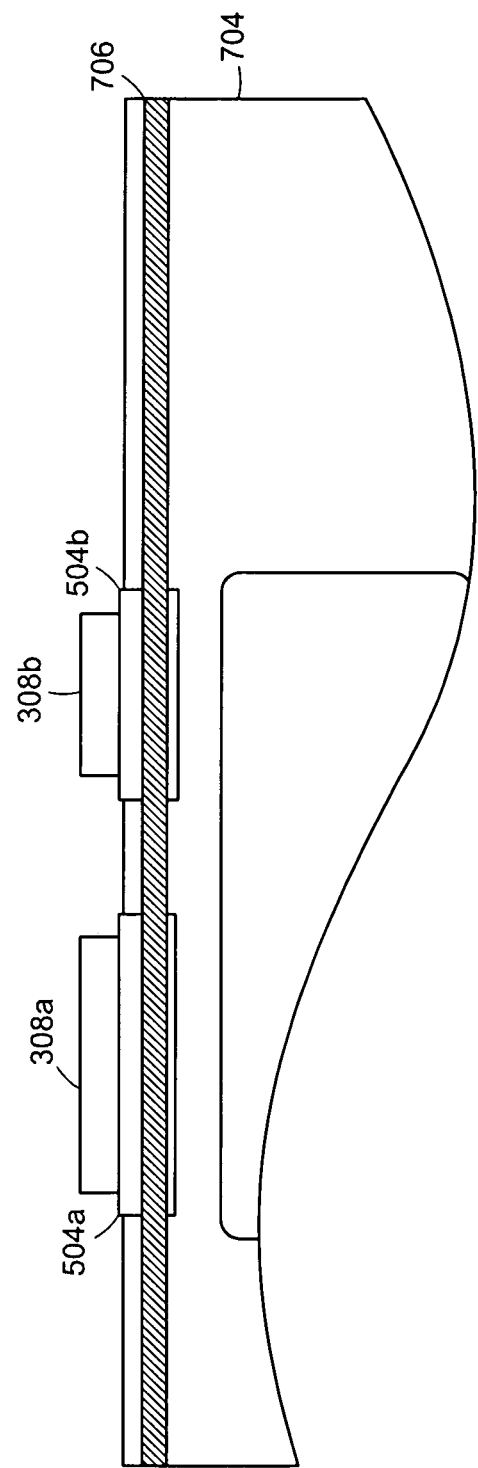
FIG. 7 is a diagram illustrating a top seal of a prismatic battery cell according to various embodiments.

In an embodiment, the extension tabs are thin, flat tabs, such that the length and the width of the positive extension tab 308a are each at least 10 times the thickness of the positive extension tab 308a. The length and the width of the negative extension tab 308b are each at least 10 times the thickness of the negative extension tab 308b. The length dimension of the extension tabs 308a, 308b is shown in FIG. 6 as extending vertically and the width dimension extending horizontally. The thickness dimension of the extension tabs extends into the page of FIG. 6, and is also shown in the embodiment of FIG. 2B. In another embodiment, the length and the width of the positive extension tab are each at least 50 times the thickness of the positive extension tab, and the length and the width of the negative extension tab are each at least 50 times the thickness of the negative extension tab. In another embodiment, the length and the width of the positive extension tab are each at least 100 times the thickness of the positive extension tab, and the length and the width of the negative extension tab are each at least 100 times the thickness of the negative extension tab. As shown in FIG. 7, the pouch is sealed around the positive electrode sheets and the negative electrode sheets such that the positive extension tab 308a and the negative extension tab 308b extend outside of the pouch.

In particular, FIG. 7 is a diagram illustrating a top seal 706 of the prismatic battery cell according to some embodiments. A portion of a cell enclosure or pouch 704 is shown. Cell enclosure 704 is used to enclose the inner components of the cell assembly. In some embodiments, enclosure 704 can include two sheets of pouch material placed on the front and back side of the stacked electrodes seamed together at the edges to enclose and hermetically seal the stacked electrodes. Strips 504a, 504b can be made of a material that matches the pouch material of enclosure 704, so that when the top edges of the cell enclosure sheets are seamed together, the top edges can be firmly attached to the strips 504a, 504b (and therefore the tab assemblies) for the portions where they are separated by the tab assemblies. In this manner, a top seal 706 can be formed across strips 504a, 504b respectively attached to extension tabs 308a, 308b. By way of example, the width of the seal can be approximately 5 mm. The separator sheet 404 is shown between the electrode plates 302a, 302b.

Figure 8:
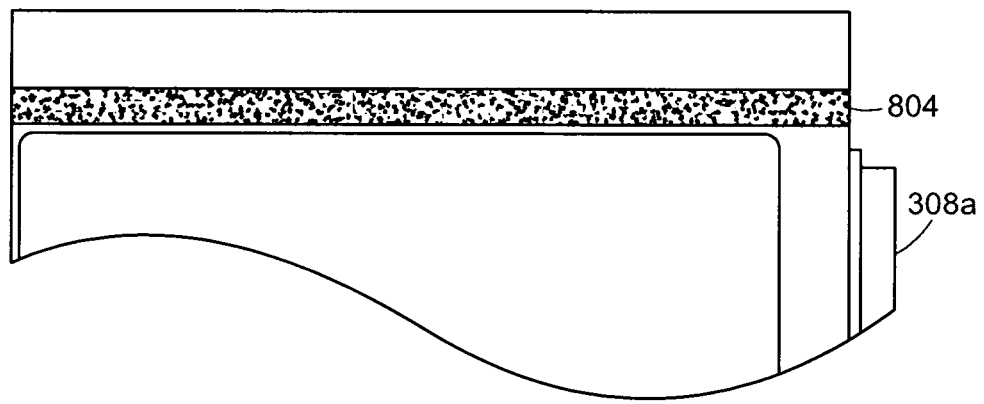
FIG. 8 is a diagram illustrating a side seal of a prismatic battery cell according to various embodiments.
Figure 9:
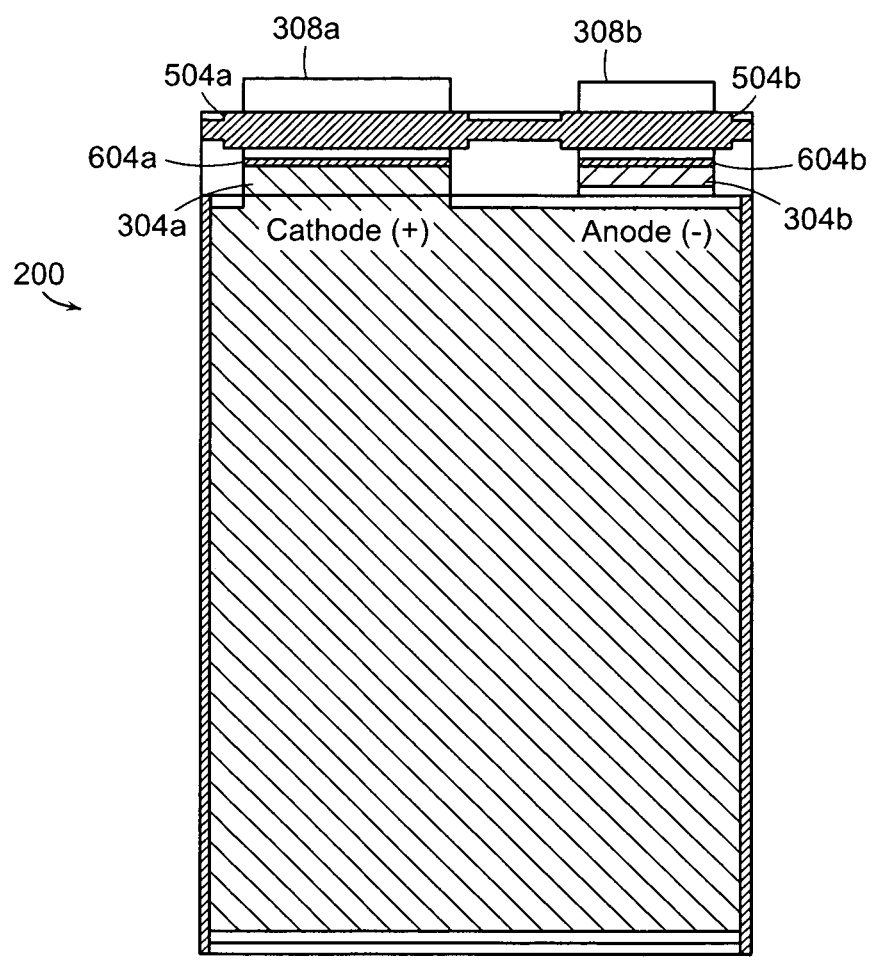
FIG. 9 is a diagram illustrating various components of a prismatic battery cell and its tab assembly, according to various embodiments.

FIG. 8 is a diagram illustrating a side seal 804 of the prismatic battery cell formed by seaming together the side edges of enclosure sheets. By way of example, the width of side seal 804 can be approximately 10 mm. It is noted that although FIGS. 7-8 illustrate the use of one type of cell enclosure, any other suitable types of cell enclosure can be used to hermetically seal the inner components of a cell assembly. FIG. 9 is a diagram showing various components of one example of a complete prismatic battery cell 200 according to some embodiments, including current collecting tabs 304a, 304b, extension tabs 308a, 308b, welding sections 604a, 604b, and strips 504a, 504b.

Simulations have been conducted to demonstrate benefits obtained from the invention by providing different cross sectional ratios between the extension tabs 308a, 308b. FIGS. 10-16 are diagrams illustrating results of simulation performed for this purpose. FIGS. 10-16 illustrate temperature distributions for various prismatic battery cell designs. The diagrams are based on data obtained from 3D transient thermal analysis of prismatic cells having a 214×153×7.3 mm cell body. The thermal analysis can be based on simulations using computer models of the battery cells. A computer model can be a finite element model as shown in FIG. 17, in which the cell is separated into small tetrahedral thermal solid elements for analysis. For the simulations, certain heat generation and heat conducting properties can be selected for various parts of the battery cells. For example, the cell body can be modeled as a heat generator with orthotropic heat conduction properties, and the power terminals (or extension tabs) can be modeled as a heat generator with isotropic heat conduction properties. More particularly, the cell body is assumed to have a density of 2.7 e+006 g/m^3, specific heat of 1 J/gK, thermal conductivity of 40 W/mK in the X and Y directions and 0.6 W/mK in the Z direction. (g=grams, m=meters, J=Joules, K=Kelvin, and W=Watts.) Specific heat is the amount of energy it takes to raise the temperature of a unit mass of material. The positive tab is assumed to have a density of 2.7 e+006 g/m^3, specific heat of 0.904 J/gK, and thermal conductivity of 230 W/mK in the X, Y, and Z directions. The negative tab is assumed to have a density of 8.96 e+006 g/m^3, specific heat of 0.385 J/gK, and thermal conductivity of 385 W/mK in the X, Y, and Z directions. It is assumed that heat transfer from the cell takes place only on the large, flat surfaces of the cell to air by convection to an ambient temperature and through the end of the tabs by conduction to a fixed temperature of 35 degrees Celsius. The ambient temperature is assumed to be 35 degrees Celsius and the convection film coefficient is assumed to be 10 W/m^2K.

Figure 10:
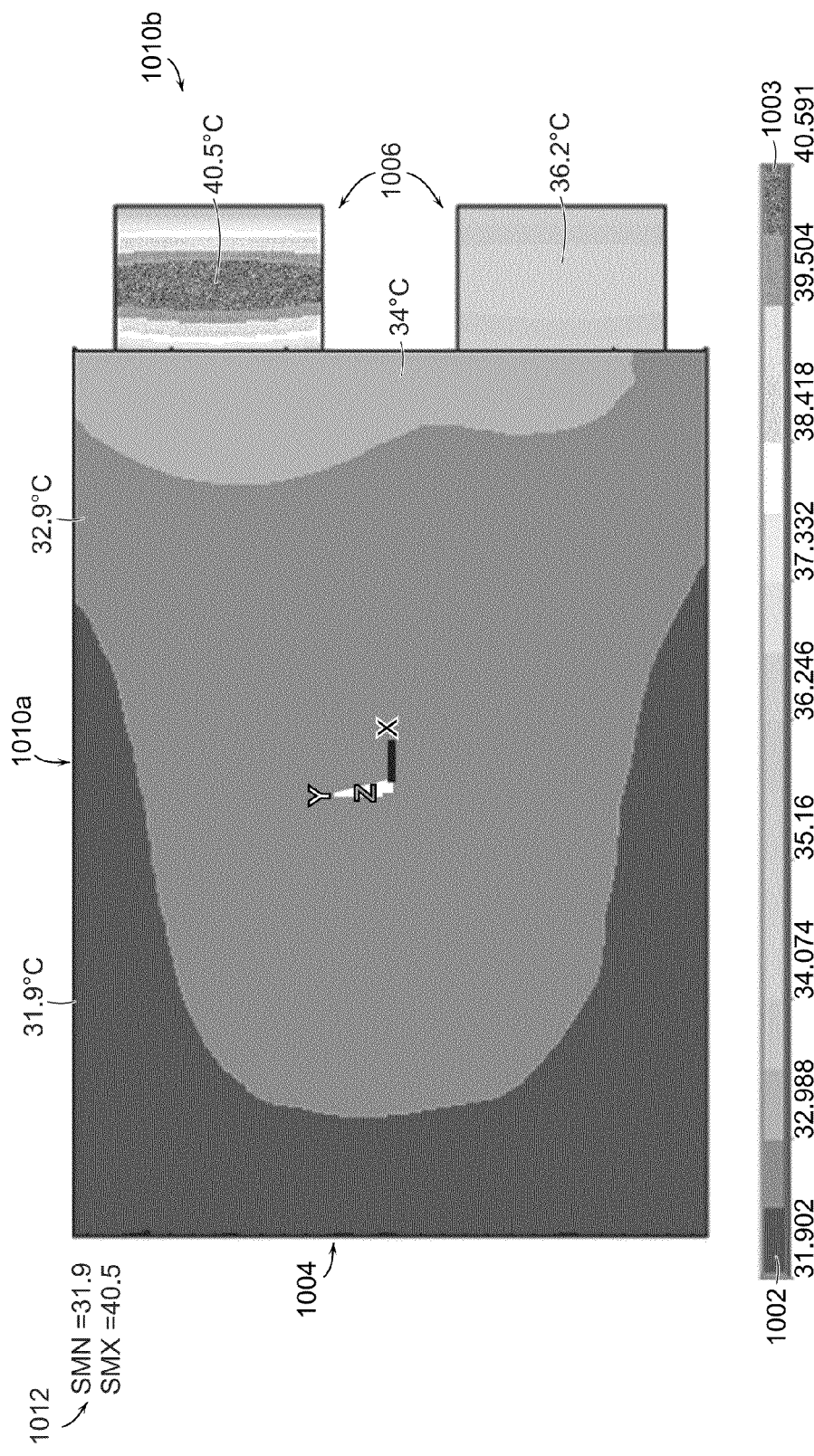
FIGS. 10-16 are diagrams illustrating temperature distributions for various prismatic battery cell designs.

The diagrams in FIGS. 10-16 provide front views of the cells for different designs that are modeled, including the cell body (e.g., cell body 1004 in FIG. 10) and the extension tabs (e.g., terminals 1006 in FIG. 10). The dimensions of the extension tabs are shown at the bottom of each diagram (e.g., at location 1008 in FIG. 10). Temperature of the battery cell across the battery cell after 60 seconds is depicted using temperature scales (e.g., scale 1002 in FIG. 10). For example, in FIG. 10, region 1010a corresponds to the lower end of temperature scale 1002 and therefore has a temperature of approximately 31.9 degrees Celsius, and region 1010b corresponds to the higher end of temperature scale 1003 and therefore has a temperature of approximately 40.6 degrees Celsius. The minimum and maximum temperatures of the cell are also shown to the top left of the illustrated cells (e.g., location 1012 in FIG. 10).

FIG. 10 shows that if the power terminals or extension tabs have identical sizes (50 mm), temperatures at the two terminals are different. When the aluminum extension tab is approximately 50 mm wide, and the copper tab is approximately 50 mm wide, the temperatures at the two terminals are not uniform. This results in a temperature gradient.

Figure 11:
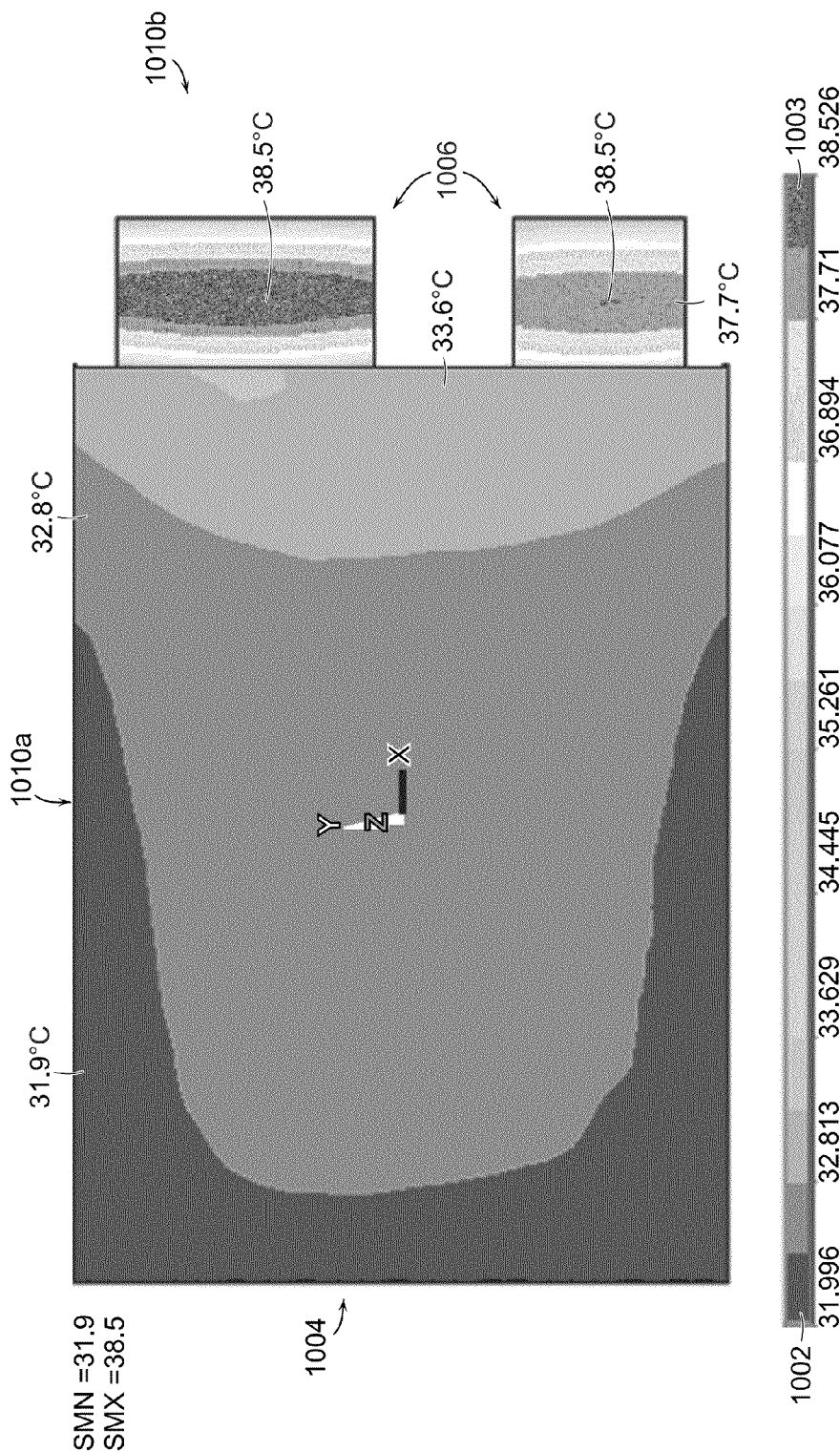

FIG. 11 shows that when the aluminum tab is approximately 60 mm wide, and the copper tab is approximately 40 mm wide, the temperature gradient between the two terminals is reduced. The minimum temperature is approximately 31.9 degrees Celsius and the maximum temperature is approximately 38.5 degrees Celsius after 60 seconds. This results in a smaller temperature gradient and the temperature of the hottest point in the cell in FIG. 11 is smaller than the temperature of hottest point in the cell in FIG. 10.

Figure 12:
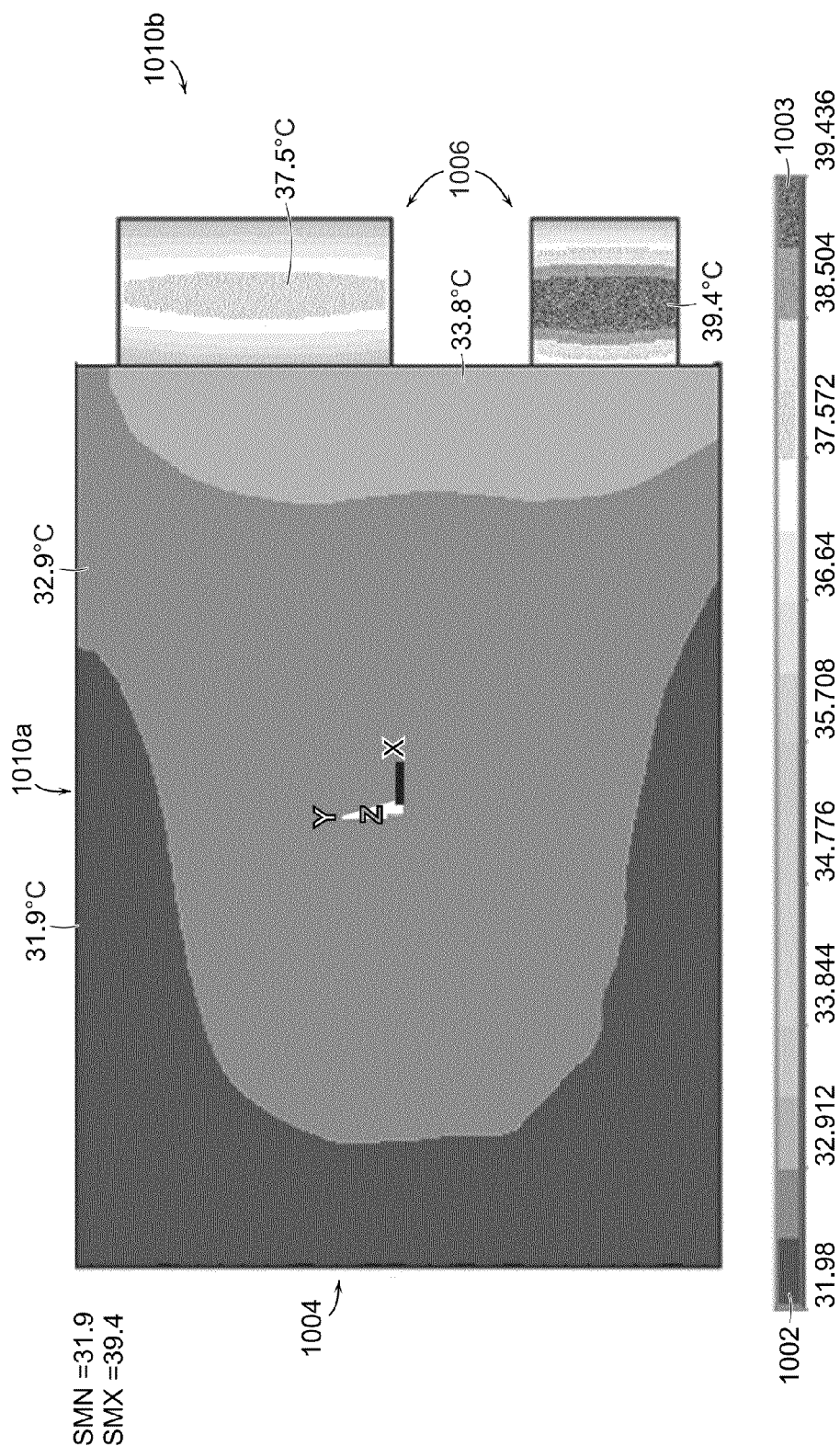
Figure 13:
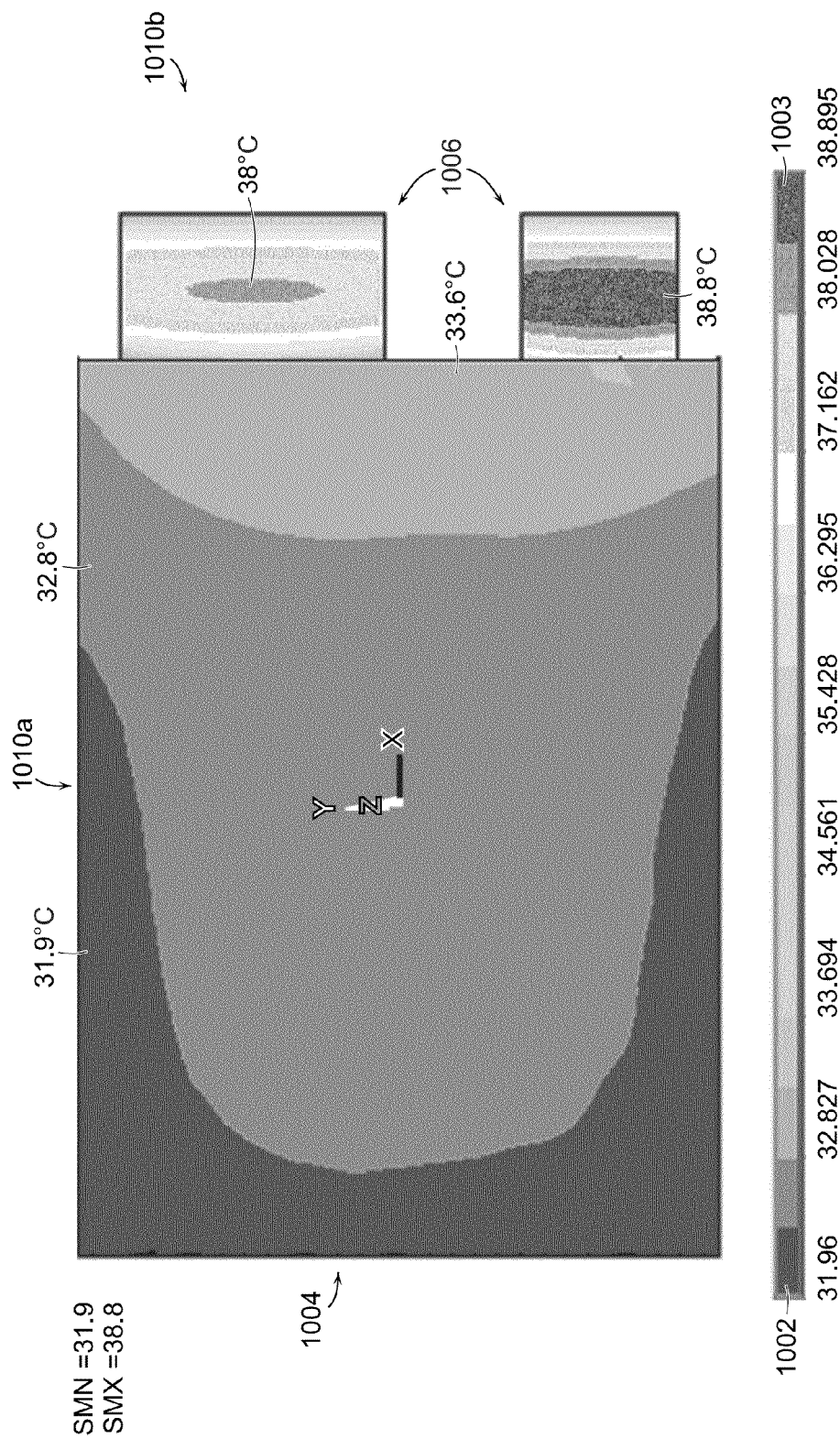
Figure 14:
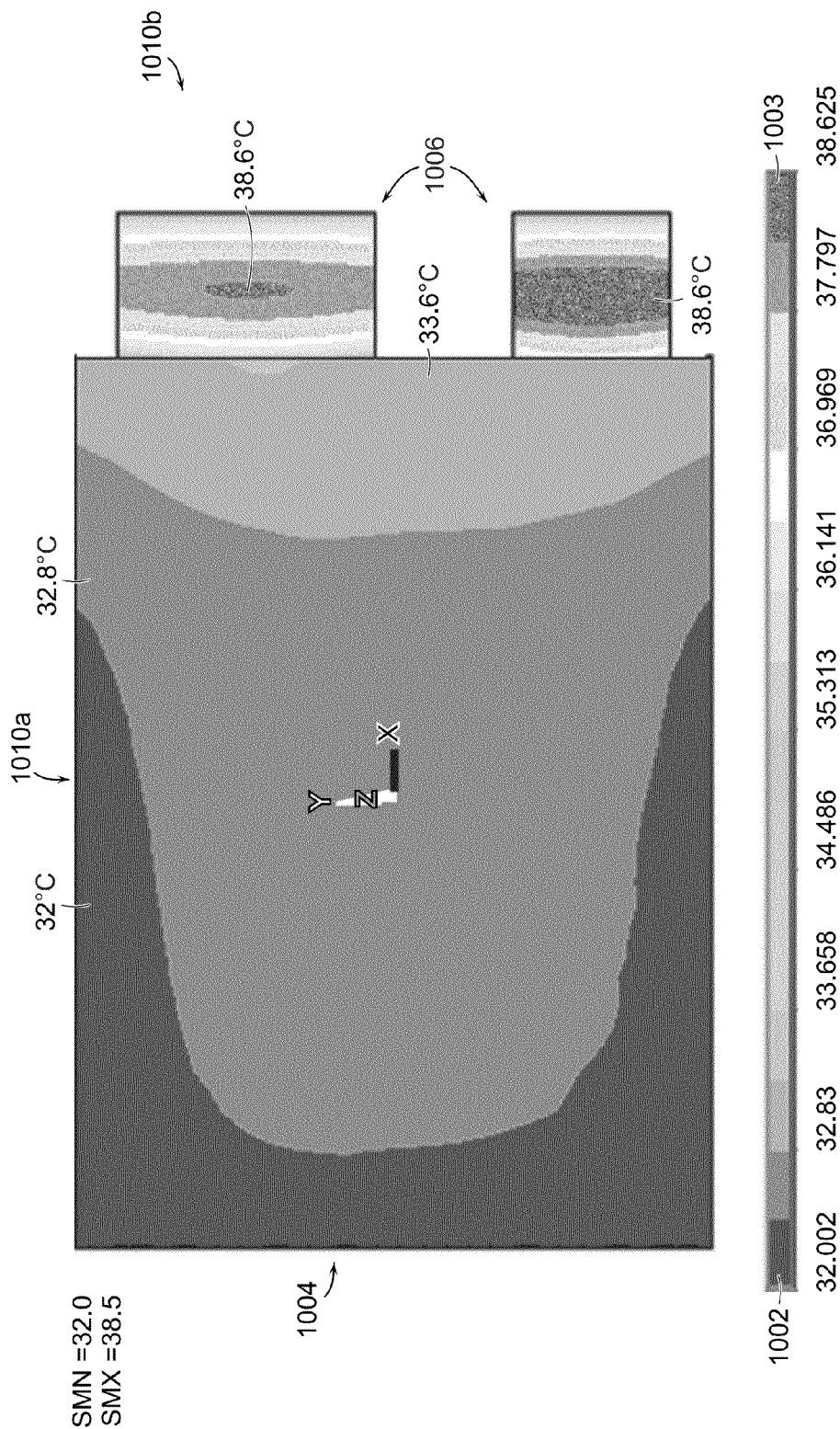

FIG. 12 shows that when the aluminum tab is approximately 65 mm wide, and the copper tab is approximately 35 mm wide, the temperature gradient between the two terminals is altered. The minimum temperature is approximately 31.9 degrees Celsius and the maximum temperature is approximately 39.4 degrees Celsius after 60 seconds, thereby demonstrating a change in temperature based on a different cross section area ratio between the extension tabs. FIG. 13 shows that when the aluminum tab is approximately 63 mm wide, and the copper tab is approximately 37 mm wide. The minimum temperature is approximately 31.9 degrees Celsius and the maximum temperature is approximately 38.8 degrees Celsius after 60 seconds. FIG. 14 shows that when the aluminum tab is approximately 62 mm wide, and the copper tab is approximately 38 mm wide, the maximum temperature is lowered with respect to that in FIGS. 12 and 13. The minimum temperature is approximately 32 degrees Celsius and the maximum temperature is approximately 38.6 degrees Celsius after 60 seconds.

Figure 15:
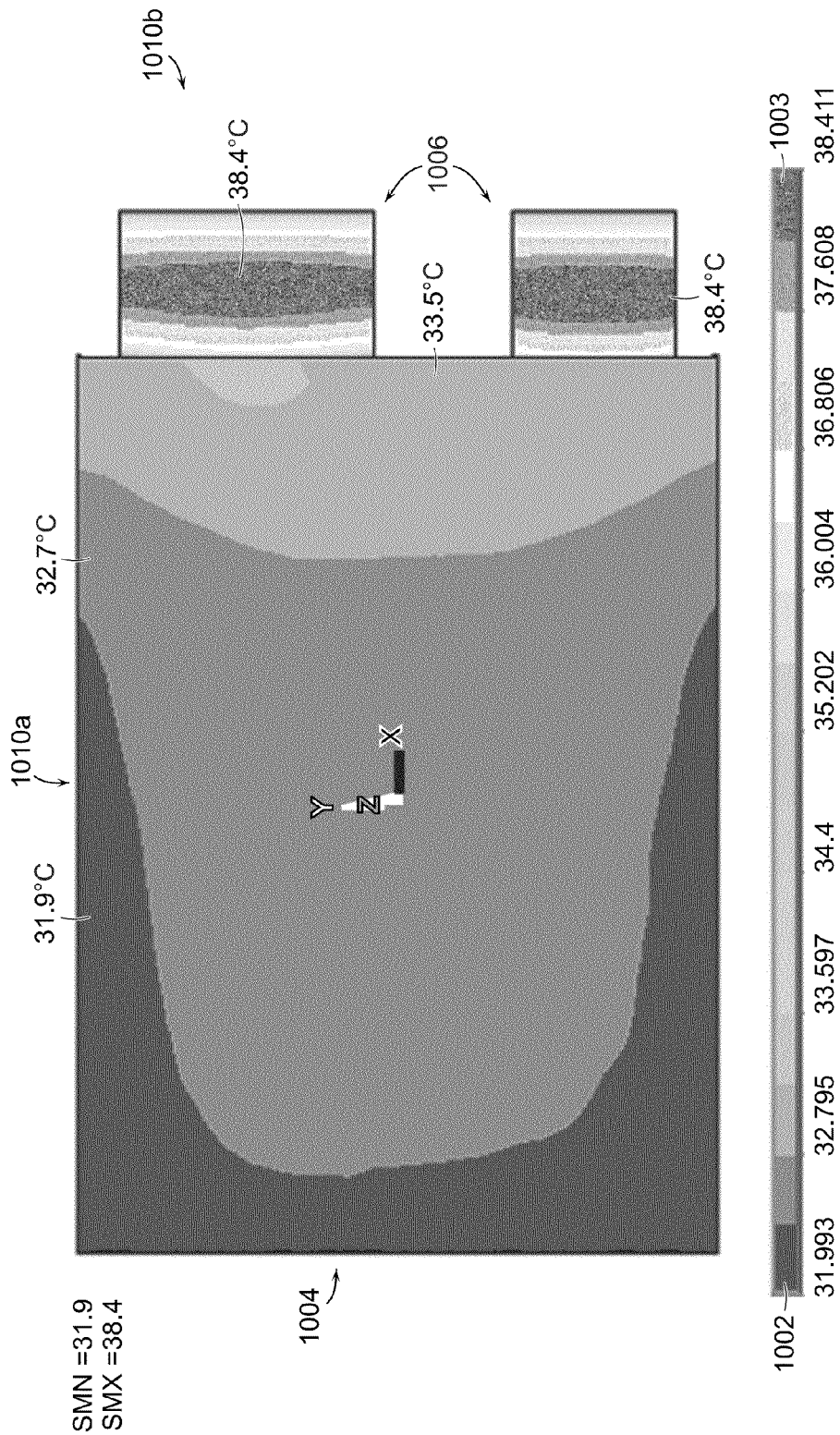
Figure 16:
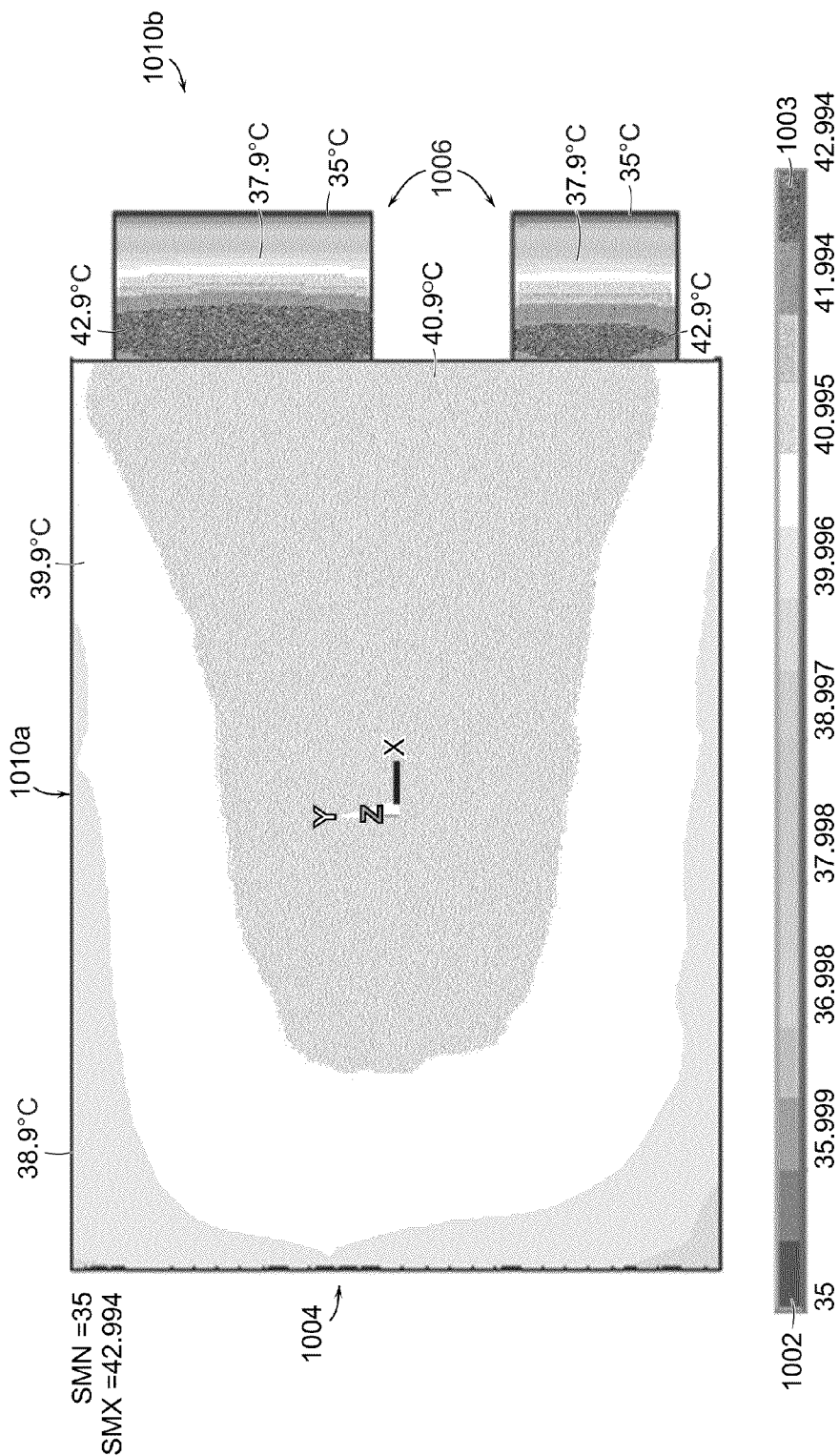
Figure 17:
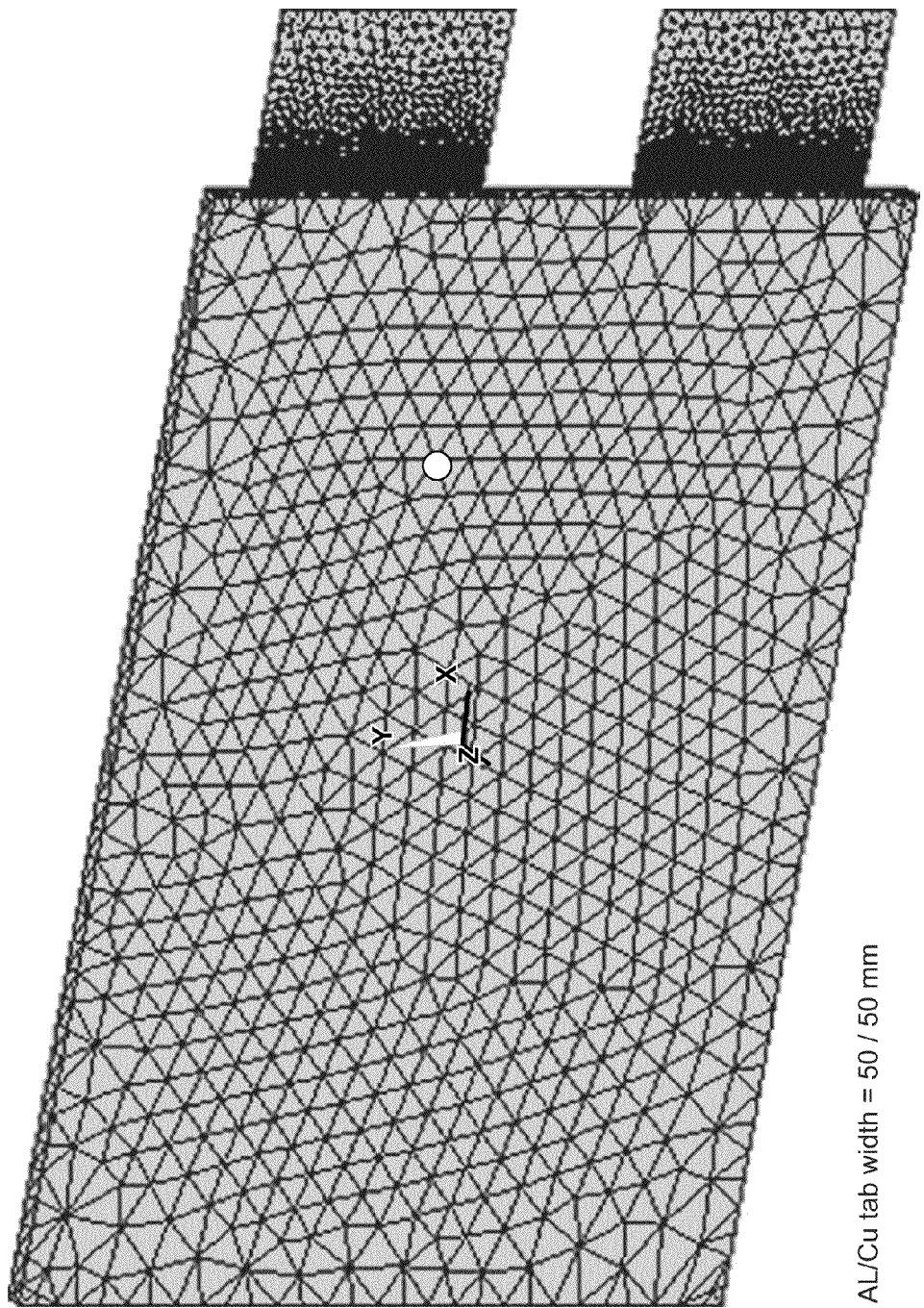
FIG. 17 is a diagram illustrating a finite element model used for simulating temperature changes of a battery cell.

FIGS. 15 and 16 show that when the aluminum tab is approximately 61 mm wide, and the copper tab is approximately 39 mm wide, the temperatures at the two terminals are approximately uniform after 60 seconds. This results in a smaller temperature gradient. The analyses whose results are shown in FIGS. 15 and 16 are identical with the exception of a different ASI selected for that in FIG. 16. The volumetric heat generation of the body of the cell is directly proportional to ASI. The significance of FIGS. 15 and 16 is that they show that exemplary embodiments of the invention have utility over a range of rates of heat generation as opposed to only at a single rate of heat generation. FIG. 15 shows a max temp of 38.411. FIG. 16 shows a max temp of 42.994 ("SMX" denotes the max temperature shown in the plot).

Hence, the analysis illustrated in connection with FIGS. 10-17, de¶monstrate beneficial aspects of the invention that provide a suitable temperature gradient, as well as minimizing or reducing the temperature of the hottest point of the cell.

Figure 18:
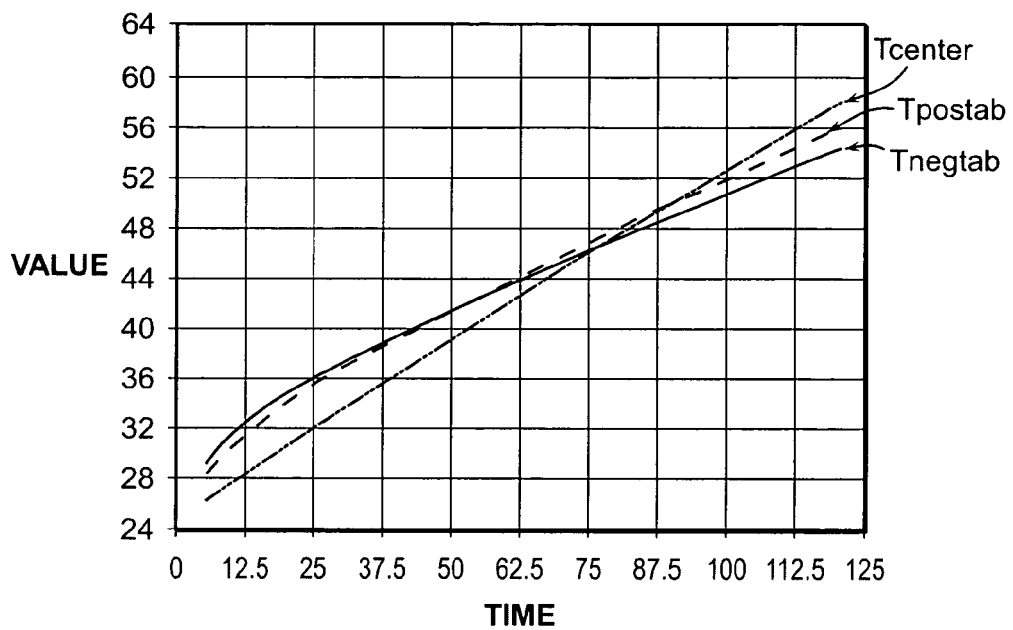
FIG. 18 is a chart illustrating temperature changes at various points of a prismatic battery cell over time.

FIG. 18 is a chart illustrating temperature changes at various points of a prismatic battery cell over time. The battery cell has a positive aluminum extension tab with a width of 61 mm and a negative copper extension tab with a width of 39 mm. The chart is based on data obtained from the thermal analysis described above. Line "Tcenter" shows temperature changes in the center of the cell body. Lines "Tnegtab" and "Tpostab" respectively show temperature changes in the center of the negative extension tab and the positive extension tab at the intersection with the cell body. As shown, temperature differences at these three locations are generally small.

Figure 19:
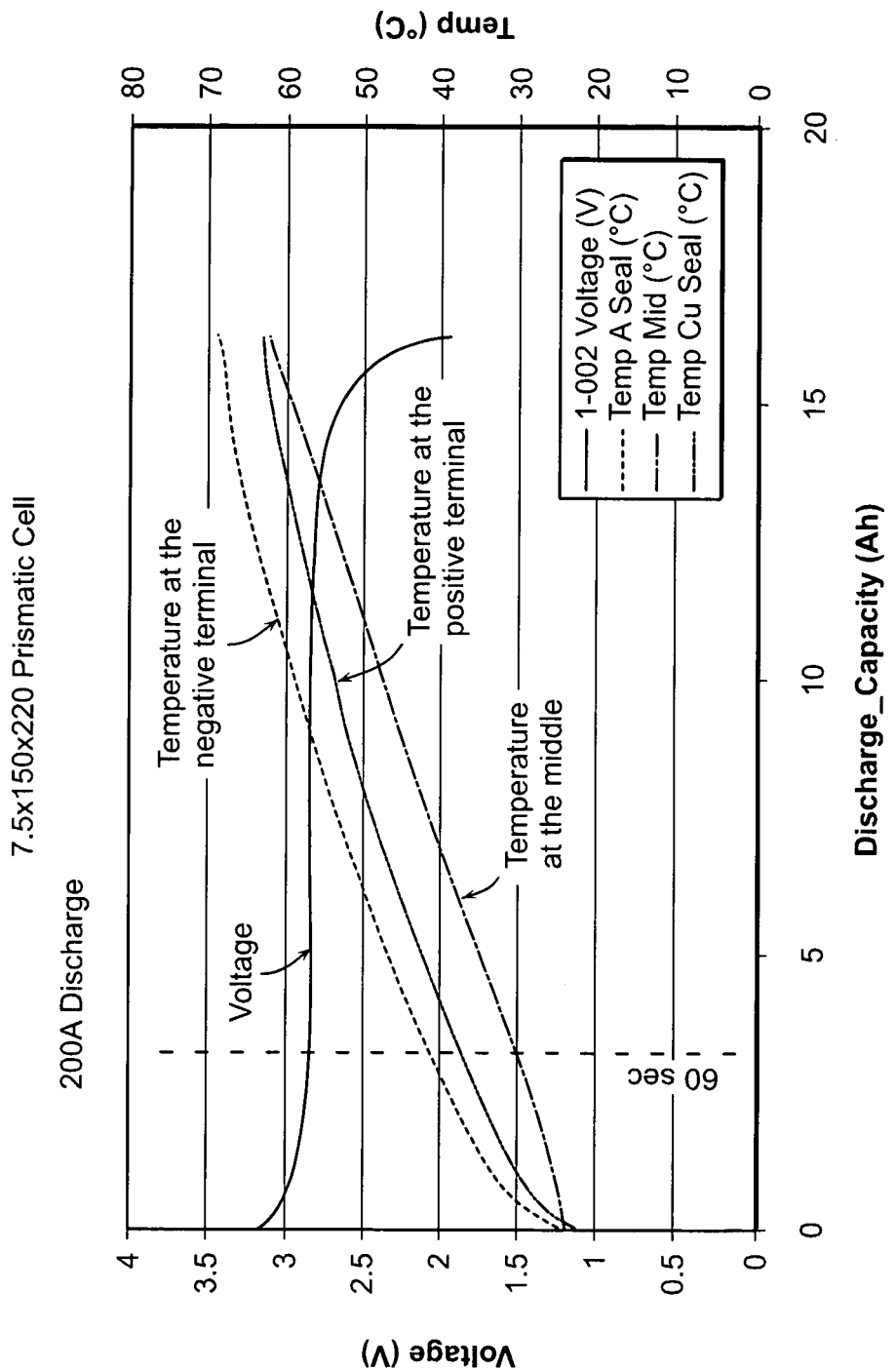
FIG. 19 is a chart illustrating temperature and voltage changes at various points of a prismatic battery cell over time.

FIG. 19 is a chart illustrating temperature and voltage changes of a prismatic battery cell over time. The body of the cell has a dimension of 7.5×150×200 mm. The positive extension tab has a width of 56.5 mm, and the negative extension tab has a width of 36 mm. As shown, temperature at the positive extension tab is relatively close to temperature at the negative extension tab.

Although the descriptions above are centered on prismatic cell designs, embodiments of the present invention can also be applied to other battery cells such as cylindrical cells. For example, in a cylindrical cell, the dimensions of the current collecting tabs or the extension tabs for the positive and negative terminals can also be made proportional to the electrical resistivity and thermal conductivity of their respective materials of construction, so that temperature gradient and/or maximum temperature are reduced. This would benefit the performance of the cylindrical cell in terms of battery life and safety. Also, embodiments of the present invention can be applied to any electrochemical cell that uses relatively thin electrodes, which are typically designed to operate at relatively high rates. Examples of such cells include nickel/metal hydride cells and nickel/cadmium cells. Various embodiments have been illustrated and described herein by way of example, and one of skill in the art will appreciate that variation can be made without departing from the spirit and scope of the invention.

The invention claimed is:

1. An electrochemical cell, comprising:
a plurality of positive electrode sheets having current collecting tabs which are portions of the positive electrode sheets that extend outwardly;
a plurality of negative electrode sheets having current collecting tabs which are portions of the negative electrode sheets that extend outwardly, the current collecting tabs of the positive electrode sheets have a width that is different than a width of the current collecting tabs of the negative electrode sheets, and the positive and negative electrode sheets being layered in the cell;
a positive extension tab extended from the current collecting tabs of the positive electrode sheets; and
a negative extension tab extended from the current collecting tabs of the negative electrode sheets,
wherein a cross sectional area of the positive extension tab is different than a cross sectional area of the negative extension tab, a width of the positive extension tab is the same as the width of the current collecting tabs of the positive electrode sheets, and a width of the negative extension tab is the same as the width of the current collecting tabs of the negative electrode sheets, and
wherein the cross sectional area of the positive extension tab provides a temperature gradient in the positive extension tab during discharge, and the cross sectional area of the negative extension tab provides a temperature gradient in the negative extension tab during discharge, the temperature gradient of the positive extension tab corresponds uniformly to the temperature gradient of the negative extension tab.

2. The electrochemical cell of claim 1, wherein the positive electrode sheets comprise a first active material, the current collecting tabs of the positive electrode sheets are extended portions of the positive electrodes sheets that are not covered by the first active material, and
the negative electrode sheets comprise a second active material, the current collecting tabs of the negative electrode sheets are extended portions of the negative electrodes sheets that are not covered by the second active material.

3. The electrochemical cell of claim 1, wherein dimensions of the positive extension tab comprise a width and thickness, and dimensions of the negative extension tab comprise a width and thickness, the width of the positive extension tab being different than the width of the negative extension tab.

4. The electrochemical cell of claim 1, wherein dimensions of the positive extension tab comprise a width and thickness, and dimensions of the negative extension tab comprise a width and thickness, the thickness of the positive extension tab being different than the thickness of the negative extension tab.

5. The electrochemical cell of claim 4, wherein the thickness and the width of the positive extension tab are different than the thickness and the width of the negative extension tab.

6. The electrochemical cell of claim 1, wherein the current collecting tabs of the positive electrode sheets are welded together to provide a welded portion and the current collecting tabs of the negative electrode sheets are welded together to provide another welded portion.

7. The electrochemical cell of claim 6, wherein the positive extension tab is welded to the positive current collecting tabs, and the negative extension tab is welded to the negative current collecting tabs.

8. The electrochemical cell of claim 1, wherein the electrochemical cell comprises a pouch enclosing the positive electrode sheets and the negative electrode sheets, the pouch being sealed around the positive electrode sheets and the negative electrode sheets such that the positive extension tab and the negative extension tab extend outside of the pouch.

9. The electrochemical cell of claim 8, wherein a sealant material is disposed on the positive extension tab and the negative extension tab to form a seal with the pouch.

10. The electrochemical cell of claim 8, wherein the pouch material is comprised of laminated layers comprising at least one of polyethylene, nylon, and aluminum foil.

11. The electrochemical cell of claim 1, wherein the positive extension tab is disposed on an outermost one of the current collecting tabs of the positive electrode sheets; and the negative extension tab is disposed on an outermost one of the current collecting tabs of the negative electrode sheets.

12. The electrochemical cell of claim 1, wherein the positive extension tab comprises aluminum and the negative extension tab comprises copper, the cross-sectional area of the negative extension tab is about ⅔ the cross-sectional area of the positive extension tab.

13. The electrochemical cell of claim 1, wherein the positive extension tab comprises aluminum and the negative extension tab comprises nickel, the cross-sectional area of the negative extension tab is about ⅔ the cross-sectional area of the positive extension tab.

14. The electrochemical cell of claim 1, wherein the positive extension tab comprises aluminum and the negative extension tab comprise copper, the positive extension tab is approximately 60 mm thick, and the negative extension tab is approximately 40 mm thick.

15. The electrochemical cell of claim 1, wherein the negative electrode sheets and the positive electrode sheets form cathode sheets and anode sheets, and the anode sheets are wider and longer than the cathode sheets.

16. The electrochemical cell of claim 1, wherein a separator sheet is interposed between the positive electrode sheets and the negative electrode sheets.

17. The electrochemical cell of claim 16, wherein the separator sheet is a continuous sheet that is folded between the positive electrode sheets and the negative electrode sheets.

18. The electrochemical cell of claim 1, wherein the electrochemical cell is a prismatic lithium ion cell.

19. The electrochemical cell of claim 1, wherein the positive extension tab has a predetermined cross sectional area, and the negative extension tab has a different predetermined cross sectional area, such that during use the positive extension tab has a first temperature and the negative extension tab has a second temperature to form an optimal temperature difference between the positive extension tab temperature and the negative extension tab temperature, and
wherein the optimal temperature difference will not be decreased any further by changing the ratio of the cross sectional areas of the positive and negative extension tabs.

20. A lithium battery, comprising:
a plurality of positive electrode sheets having current collecting tabs which are portions of the positive electrode sheets that extend outwardly;
a plurality of negative electrode sheets having current collecting tabs which are portions of the negative electrode sheets that extend outwardly, the current collecting tabs of the positive electrode sheets have a width that is different than a width of the current collecting tabs of the negative electrode sheets;
an electrolyte in ionic contact with the positive and negative electrode sheets;
a positive extension tab extended from the current collecting tabs of the positive electrode sheets; and
a negative extension tab extended from the current collecting tabs of the negative electrode sheets,
a pouch enclosing the positive and negative electrode sheets, the pouch being sealed around the positive and negative electrode sheets such that the positive extension tab and the negative extension tab extend from inside to outside of the pouch,
wherein a cross sectional area of the positive extension tab is different than a cross sectional area of the negative extension tab, a width of the positive extension tab is the same as the width of the current collecting tabs of the positive electrode sheets, and a width of the negative extension tab is the same as the width of the current collecting tabs of the negative electrode sheets, and
wherein the cross sectional area of the positive extension tab provides a temperature gradient in the positive extension tab during discharge, and the cross sectional area of the negative extension tab provides a temperature gradient in the negative extension tab during discharge, the temperature gradient of the positive extension tab corresponds uniformly to the temperature gradient of the negative extension tab.

21. The lithium battery of claim 20, wherein the positive electrode sheets comprise a first active material, the current collecting tabs of the positive electrode sheets are extended portions of the positive electrodes sheets that are not covered by the first active material, and
the negative electrode sheets comprise a second active material, the current collecting tabs of the negative electrode sheets are extended portions of the negative electrodes sheets that are not covered by the second active material.

22. The lithium battery of claim 20, wherein dimensions of the positive extension tab comprise a width and thickness, and dimensions of the negative extension tab comprise a width and thickness, the width of the positive extension tab being different than the width of the negative extension tab.

23. The lithium battery of claim 20, wherein dimensions of the positive extension tab comprise a width and thickness, and dimensions of the negative extension tab comprise a width and thickness, the thickness of the positive extension tab being different than the thickness of the negative extension tab.

24. The lithium battery of claim 20, wherein the positive extension tab is disposed on an outermost one of the current collecting tabs of the positive electrode sheets; and the negative extension tab is disposed on an outermost one of the current collecting tabs of the negative electrode sheets.

25. The lithium battery of claim 20, wherein the positive extension tab comprises aluminum and the negative extension tab comprises copper, the cross-sectional area of the negative extension tab is about ⅔ the cross-sectional area of the positive extension tab.

26. The lithium battery of claim 20, wherein the positive extension tab comprises aluminum and the negative extension tab comprises nickel, the cross-sectional area of the negative extension tab is about ⅔ the cross-sectional area of the positive extension tab.

27. The lithium battery of claim 20, wherein a continuous separator sheet is folded between the positive electrode sheets and the negative electrode sheets.

28. The lithium battery of claim 20, wherein the positive extension tab has a predetermined cross sectional area, and the negative extension tab has a different predetermined cross sectional area, such that during use the positive extension tab has a first temperature and the negative extension tab has a second temperature to form an optimal temperature difference between the positive extension tab temperature and the negative extension tab temperature, and
wherein the optimal temperature difference will not be decreased any further by changing the ratio of the cross sectional areas of the positive and negative extension tabs.

29. A method of making an electrochemical cell, comprising:
providing a plurality of positive electrode sheets with current collecting tabs which are portions of the positive electrode sheets that extend outwardly;
providing a plurality of negative electrode sheets with current collecting tabs which are portions of the negative electrode sheets that extend outwardly, the current collecting tabs of the positive electrode sheets have a width that is different than a width of the current collecting tabs of the negative electrode sheets, and the positive and negative electrode sheets being layered in the cell;
extending a positive extension tab from the current collecting tabs of the positive electrode sheets;
extending a negative extension tab from the current collecting tabs of the negative electrode sheets,
selecting a cross sectional area of the positive extension tab to be different than a cross sectional area of the negative extension tab, and
selecting a width of the positive extension tab to be the same as the width of the current collecting tabs of the positive electrode sheets, and selecting a width of the negative extension tab to be the same as the width of the current collecting tabs of the negative electrode sheet,
wherein the cross sectional area of the positive extension tab provides a temperature gradient in the positive extension tab during discharge, and the cross sectional area of the negative extension tab provides a temperature gradient in the negative extension tab during discharge, the temperature gradient of the positive extension tab corresponding uniformly to the temperature gradient of the negative extension tab.

30. The method of claim 29, wherein the selecting comprises selecting the cross sectional area of the positive extension tab to be different than the cross sectional area of the negative extension tab based on at least one of electrical resistively and thermal conductivity of the positive and negative extension tabs.

31. The method of claim 29, further comprising coating portions of the positive electrode sheets with a first active material, such that the current collecting tabs of the positive electrode sheets are extended portions of the positive electrodes sheets and are not covered by the first active material, and
coating portions of the negative electrode sheets with a second active material, such that the current collecting tabs of the negative electrode sheets are extended portions of the negative electrodes sheets and are not covered by the second active material.

32. The method of claim 29, forming a thickness of the positive extension tab to be different than the thickness of the negative extension tab.

33. The method of claim 29, further comprising welding together the current collecting tabs of the positive electrode sheets to provide a welded portion and welding together the current collecting tabs of the negative electrode sheets to provide another welded portion.

34. The method of claim 29, wherein the welding comprises welding the positive extension tab to the positive current collecting tabs, and welding the negative extension tab to the negative current collecting tabs.

35. The method of claim 29, further comprising sealing a pouch around the electrochemical cell such that the positive extension tab and the negative extension tab extend from inside to outside of the pouch.

36. The method of claim 34, wherein the welding comprises welding the positive extension tab to an outermost one of the current collecting tabs of the positive electrode sheets; and welding the negative extension tab to an outermost one of the current collecting tabs of the negative electrode sheets.

37. The method of claim 29, comprising forming the cross-sectional area of the negative extension tab to be about ⅔ the cross-sectional area of the positive extension tab.

38. The method of claim 29, further comprising disposing a separator sheet between the positive and negative electrode sheets in a folded manner.

39. The method of claim 29, comprising forming the positive extension tab to have a predetermined cross sectional area, and forming the negative extension tab to have a different predetermined cross sectional area, such that during use the positive extension tab has a first temperature and the negative extension tab has a second temperature to form an optimal temperature difference between the positive extension tab temperature and the negative extension tab temperature, and
wherein the optimal temperature difference will not be decreased any further by changing the ratio of the cross sectional areas of the positive and negative extension tabs.

40. An electrochemical cell, comprising:
a plurality of positive electrode sheets having current collecting tabs which are portions of the positive electrode sheets that extend outwardly;
a plurality of negative electrode sheets having current collecting tabs which are portions of the negative electrode sheets that outwardly, the current collecting tabs of the positive electrode sheets have a width that is different than a width of the current collecting tabs of the negative electrode sheets, and the positive and negative electrode sheets being layered in the cell;
a positive extension tab extended from the current collecting tabs of the positive electrode sheets;
a negative extension tab extended from the current collecting tabs of the negative electrode sheets;
the positive and negative extension tabs respectively having a length, width and thickness;
wherein a cross sectional area of the positive extension tab is different than a cross sectional area of the negative extension tab, a width of the positive extension tab is the same as the width of the current collecting tabs of the positive electrode sheets, and a width of the negative extension tab is the same as the width of the current collecting tabs of the negative electrode sheets, wherein the length and the width of the positive extension tab are each at least 10 times the thickness of the positive extension tab, and the length and the width of the negative extension tab are each at least 10 times the thickness of the negative extension tab, and wherein the cross sectional area of the positive extension tab provides a temperature gradient in the positive extension tab during discharge, and the cross sectional area of the negative extension tab provides a temperature gradient in the negative extension tab during discharge, the temperature gradient of the positive extension tab corresponds uniformly to the temperature gradient of the negative extension tab.

41. The electrochemical cell of claim 40, wherein the length and the width of the positive extension tab are each at least 50 times the thickness of the positive extension tab, and the length and the width of the negative extension tab are each at least 50 times the thickness of the negative extension tab.

42. The electrochemical cell of claim 41, wherein the length and the width of the positive extension tab are each at least 100 times the thickness of the positive extension tab, and the length and the width of the negative extension tab are each at least 100 times the thickness of the negative extension tab.

43. The electrochemical cell of claim 40, wherein the electrochemical cell comprises a pouch enclosing the positive electrode sheets and the negative electrode sheets, the pouch being sealed around the positive electrode sheets and the negative electrode sheets such that the positive extension tab and the negative extension tab extend outside of the pouch.

* * * * *